Dec. 18, 1951 W. H. SMITH 2,578,903
SHOCK ABSORBER

Filed April 9, 1947 2 SHEETS—SHEET 1

*Inventor*
WILLIAM H. SMITH
By
*Attorney*

Dec. 18, 1951 W. H. SMITH 2,578,903
SHOCK ABSORBER

Filed April 9, 1947 2 SHEETS—SHEET 2

Inventor
WILLIAM H. SMITH
By
Attorney

Patented Dec. 18, 1951

2,578,903

UNITED STATES PATENT OFFICE 2,578,903

SHOCK ABSORBER

William Herbert Smith, East Molesey, England

Application April 9, 1947, Serial No. 740,497
In Great Britain November 13, 1944

6 Claims. (Cl. 188—1)

1

This invention relates to shock absorbers and is directed towards the provision of improved means of the kind in which shock is absorbed by energy expended on impact in movement towards each other of the parts which have to absorb the energy of impact.

In the shock absorber of the present invention the strain energy involved in the bending beyond the elastic limit of a ductile metal, such as mild steel, provides the resistance in movement towards each other of the parts subjected to shock.

One application of the invention is to the provision of crash gear for landing goods from aircraft and one form of such application will now be described.

In the accompanying drawings which illustrate various embodiments of the invention:

Figure 1:
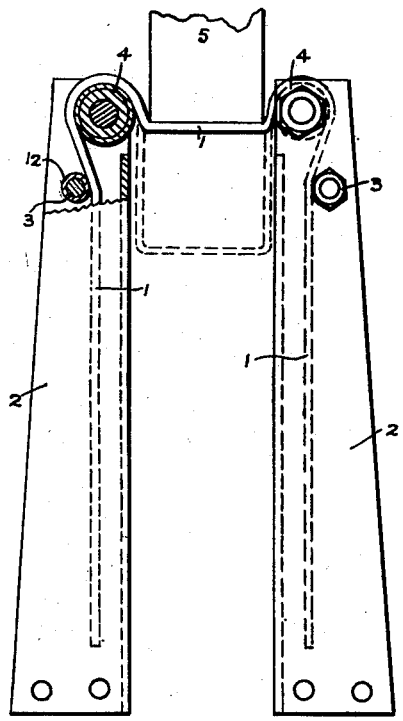
Fig. 1 shows partly in section one arrangement in elevation.
Figure 2:
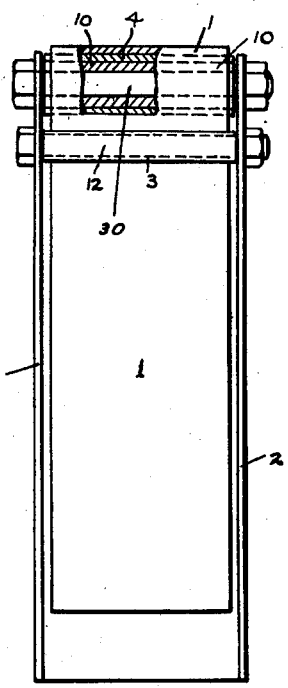
Fig. 2 shows a corresponding side view.

Referring first to Figs. 1 and 2 a mild steel strip 1, 3 inches wide and ⅛ inch thick, passes down the outer sides of vertical supports 2, over supplementary and main rollers 3, 4 at the tops of the supports, and under the plunger 5.

The gap between the plunger 5 and the vertical supports 2 is sufficient to allow the strips 1 to pass down between them; in doing so the strips are subjected to a reversing bending action as they pass first over the supplementary rollers 3 and then over the main rollers 4. The main rollers 4 bear on bushes 10 running on spindles 30. The supplementary rollers 3 turn on spindles 12.

If the strips are of constant width the resistance will be constant throughout the deformation stroke; but by making the width variable the resistance may vary with the deformation; it is considered generally preferable to make the resistance somewhat less at the beginning of the stroke than at the end.

Figure 3:
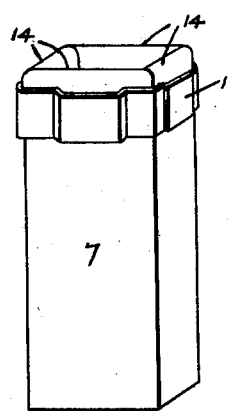
Fig. 3 shows an alternative arrangement in perspective before the strips are in position.
Figure 4:
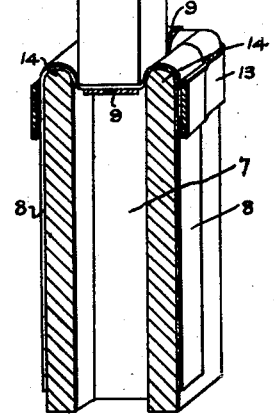
Fig. 4 is a corresponding sectional view with strips in position and the plunger starting to descend.
Figure 5:
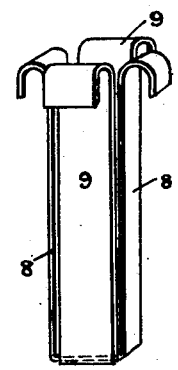
Fig. 5 shows the shape of the strips after the plunger has reached its lowest position.

In the embodiment of Figs. 3–5 a square central strut 6 passes in to a socket 7 and two sheet metal strips 8, 9 are so arranged that the plunger 6 cannot pass into the socket 7 without bending them.

The ductile strips 8, 9 are held in position by a band 13, secured to the socket 7 and offset to guide the strips.

The strips 8, 9 are bent on impact over the curved upper surfaces 14 of the socket 7 and the strain energy of this bending operation absorbs the energy of impact, the strips 8, 9 finally taking the shapes shown in Fig. 5.

Figure 6:
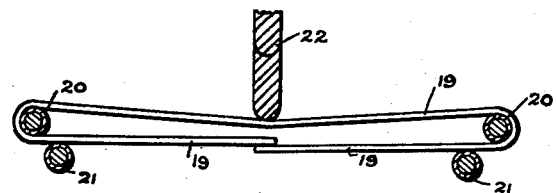
Fig. 6 shows an arrangement in which a horizontal strip absorbs energy of impact by reverse bending.

In the arrangement shown in Fig. 6 a horizontal ductile metal strip 19 passes over main rollers 20 and supplementary rollers 21. The plunger 22 is arranged centrally between the rollers 20 and as it descends it drives the strip 19 downwards and the strain energy necessary to bend it over the rollers 20 absorbs the energy of impact.

Figure 7:
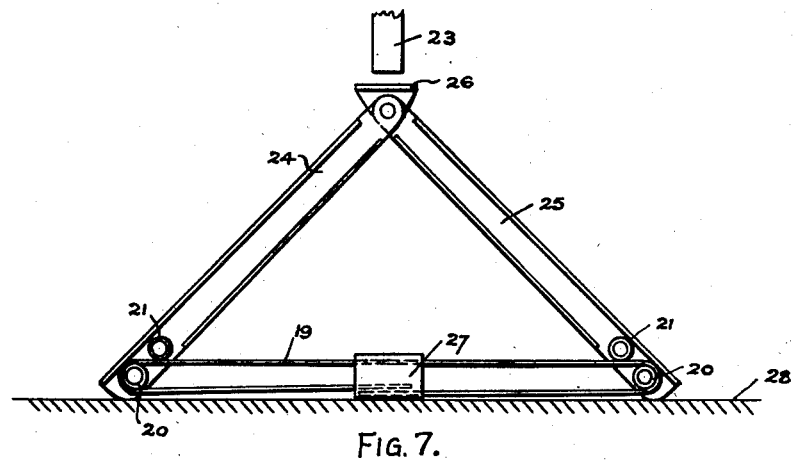
Figs. 7 and 8 show in elevation and plan respectively an arrangement similar to that of Fig. 6 but using a linkage to transmit impulsive forces.
Figure 8:
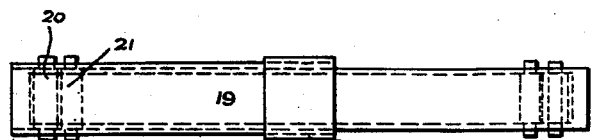

A similar arrangement is shown in Figs. 7 and 8 but in this case the rollers 20, 21 are carried on links 24, 25 which are pivoted at the top to an abutment piece 26 and are shaped at the bottom so that they can slide on a surface 28.

Impact causes the plunger 23 to strike the abutment piece 26 and the links 24, 25 then move outwards as the strip 19 is dragged through the rollers.

A sleeve 27 prevents the lower surfaces of the strip 19 from sagging.

I claim:

1. A shock absorber in which the energy of impact of two parts moving towards each other is absorbed by the strain energy due to bending a strip of ductile metal beyond its elastic limit, comprising one part comprising a pair of spaced supports having substantially cylindrically curved surfaces and a mild steel strip extending between said supports and being bent around and extending beyond said curved surfaces, and another part consisting of means movable upon impact to engage said one part and move said strip around said curved surfaces to stress the steel of the strip beyond its elastic limit and absorb the energy of impact by strain energy.

2. A shock absorber in which the energy of impact of two parts moving towards each other is absorbed by the strain energy due to bending a strip of ductile metal beyond its elastic limit, comprising a pair of spaced supports having substantially cylindrically curved surfaces, a mild steel strip extending between said supports and being bent around and extending beyond said curved surfaces, and impact means operable upon an impact to engage said strip between said supports to pull said strip around said curved surfaces to stress the steel of the strip beyond its elastic limit and absorb the energy of the impact by strain energy.

3. A shock absorber in which the energy of impact of two parts moving towards each other is absorbed by the strain energy due to bending a strip of ductile metal beyond its elastic limit, comprising a pair of spaced movable supports having substantially cylindrically curved surfaces, a mild steel strip extending between said supports and being bent around and extending beyond said curved surfaces, and impact means operable upon an impact to move said supports apart to cause relative movement of said strip around said curved surfaces to stress the steel of the strip beyond its elastic limit and absorb the energy of the impact by strain energy.

4. A shock absorber in which the energy of impact of two parts moving towards each other is absorbed by the strain energy due to bending a strip of ductile metal beyond its elastic limit, comprising a plunger having two oppositely disposed parallel sides, two supports having substantial cylindrically curved surfaces with their axes in parallel relation to each other and to said parallel plunger sides, said supports being spaced with the curved surfaces spaced to accommodate passage of the plunger therebetween, and an elongated strip of mild steel carried by the supports and bent around said curved surfaces with the intermediate portion of said strip disposed across the path of movement of the plunger to be driven by the plunger over said curved surfaces to stress the steel of the strip beyond its elastic limit and absorb the energy of the impact by strain energy.

5. A shock absorber in which the energy of impact of two parts moving towards each other is absorbed by the strain energy due to bending a strip of ductile metal beyond its elastic limit, comprising a plunger having two oppositely disposed parallel sides, two supports which are spaced to accommodate passage of said plunger therebetween, rollers journalled on each support with their axes parallel with each other and with said parallel plunger sides, and a strip of mild steel carried by said supports and passing under said plunger and around said rollers, whereby movement of said plunger due to impact between said parts moves said strip around said rollers and stresses the steel of the strip beyond its elastic limit and absorbs the energy of the impact by strain energy.

6. A shock absorber in which the energy of impact of two parts moving towards each other is absorbed by the strain energy due to bending a strip of ductile metal beyond its elastic limit, comprising a plunger of rectangular cross-section, a support defining a rectangular passage for said plunger, rectangularly disposed curved surfaces on said support, and two strips of mild steel disposed at right angles to each other and carried by said support across the passage and around said curved surfaces to strain the steel of the strips beyond its elastic limit and absorb the energy of impact by strain energy.

WILLIAM HERBERT SMITH.

REFERENCES CITED

The following references are of record in the file of this patent:

UNITED STATES PATENTS

| Number | Name | Date |
|---|---|---|
| 689,280 | Brown | Dec. 17, 1901 |
| 689,609 | Einfeldt | Dec. 24, 1901 |
| 778,743 | Ewers | Dec. 27, 1904 |
| 1,198,926 | Kemp | Sept. 19, 1916 |
| 1,530,000 | Kauffman | Mar. 17, 1925 |
| 1,649,841 | May | Nov. 22, 1927 |
| 2,112,673 | Lewis | Mar. 29, 1938 |
| 2,145,125 | Moore | Jan. 24, 1939 |
| 2,275,573 | Sturm et al. | Mar. 10, 1942 |

FOREIGN PATENTS

| Number | Country | Date |
|---|---|---|
| 7,161 | Switzerland | Aug. 4, 1893 |
| 18,213 | Great Britain | Aug. 11, 1911 |
| 18,131 | Great Britain | 1912 |
| 473,941 | Germany | Mar. 25, 1929 |